United States Patent Office 3,804,962
Patented Apr. 16, 1974

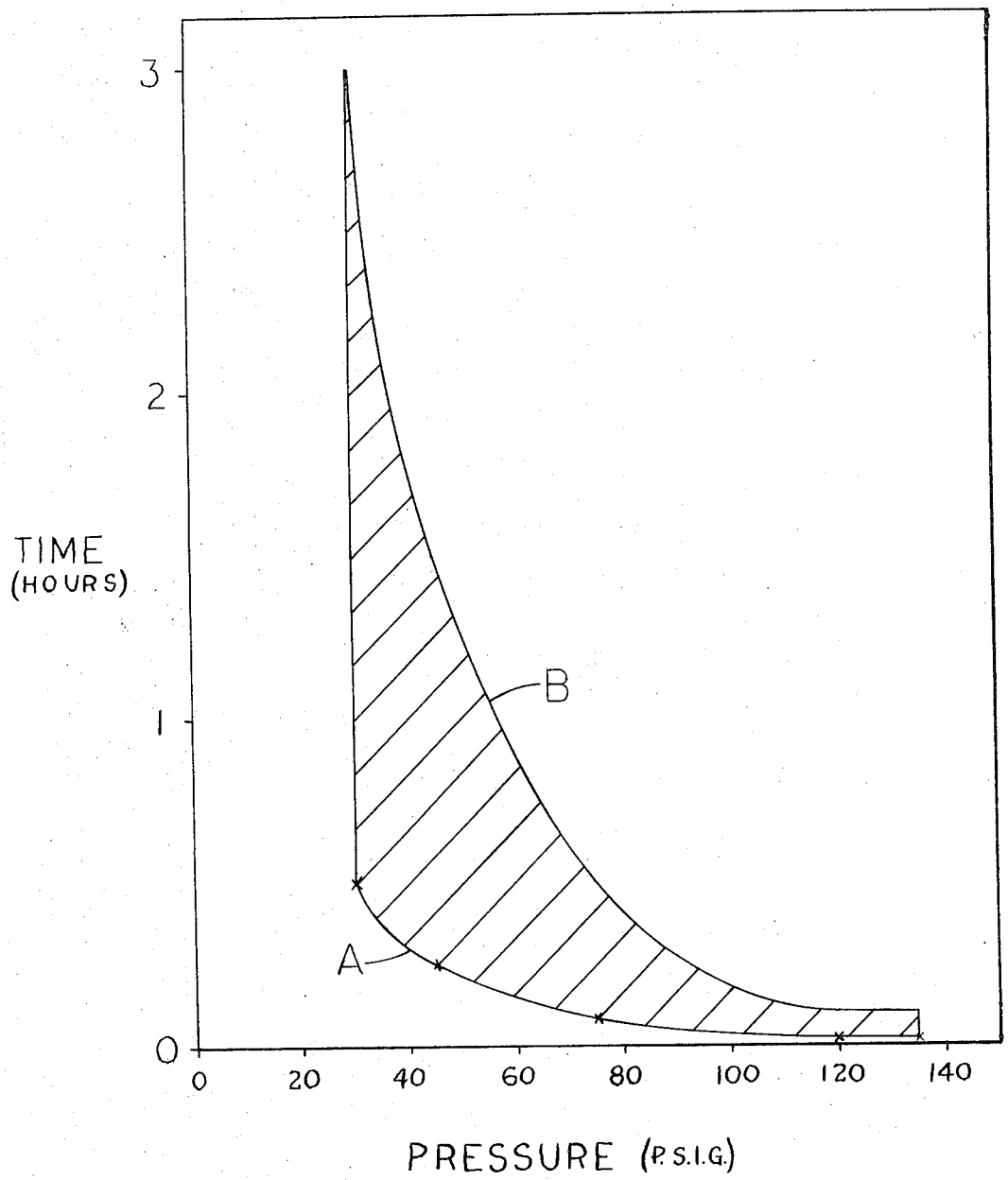

3,804,962
MEAT TREATING METHOD
David D. Pipkins, 4017 Elm St., Downers Grove, Ill. 60515
Filed Mar. 10, 1972, Ser. No. 233,539
Int. Cl. A22c 18/00
U.S. Cl. 426—418                                      3 Claims

ABSTRACT OF THE DISCLOSURE

The method is for tenderizing meat and reducing the shrinkage thereof upon subsequent cooking. The meat is subjected to substantially pure carbon dioxide at a pressure of 30 to 135 p.s.i.g. for an amount of time within the cross-hatched area of FIG. 1. The meat is thereafter stored for about 4 hours and cooked.

BACKGROUND

This invention pertains generally to food processes, and more particularly to a meat treating method.

Historically, meat has been treated in numerous ways. It has been salted, cured, flavored, tenderized, frozen, dried, chilled, smoked, preserved, etc., with the net result of such treatments being enhancement of keeping qualities, flavor, tenderness, color, and the like. It has long been known that meat can be tenderized by storing for varying periods of time during which the enzymes of the meat continue to function to catalyze the hydrolysis of the various collagens and other proteins, and otherwise break down the connective tissues. Such "natural aging" of meat can be accomplished by placing the meat in a refrigerated chamber having a temperature of 33–40° F., for a period of two to four weeks. A variation of this process is disclosed in U.S. Pat. No. 3,445,240, issued May 20, 1969 to Bedrosian et al.

Enzyme tenderization of meat has long been practiced in the meat processing industry. Various methods for bringing the enzyme into contact with the meat tissues include spraying, dipping and pumping enzyme solution onto or into the meat being treated. A technique of antemortem tenderizing involving injection of an amount of a plant-derived proteolytic enzyme solution into the vascular system of a living animal, is disclosed in U.S. Pat. No. 2,903,362, issued Sept. 8, 1959 to Beuk et al. Over tenderization sometimes occurred and a method of inactivating enzymes in meat is disclosed in U.S. Pat. No. 3,442,660, issued May 6, 1969 to Shank. That method involved exposing the meat to an atmosphere of carbon dioxide or oxygen under pressure of at least 75 p.s.i. for ½ to 72 hours to inactivate the enzymes.

Other procedures for tenderizing of meat are electrical stimulation as disclosed, for example, in U.S. Pat. No. 2,544,681, issued Mar. 13, 1951 to Harsham et al.; sonic or ultrasonic treatment as disclosed in U.S. Pat. No. 2,880,663, issued Apr. 7, 1959 to Simjian; mechanical stretching as disclosed in U.S. Pat. No. 3,579,716, issued May 25, 1971 to Stouffer et al.; and mechanically piercing the meat as disclosed in U.S. Pat. No. 3,577,585, issued May 4, 1971 to Allinguant.

It is also known to utilize carbon dioxide in the treatment of meat for various purposes. Preservation of meat using nitrous oxide and carbon dioxide is disclosed in U.S. Pat. No. 1,538,369, issued May 19, 1925 to Akiyama. Bacterial destruction using carbon dioxide under pressure and irradiation is disclosed in U.S. Pat. No. 3,483,005, issued Dec. 9, 1969 to Urbain et al. Tenderizing in an atmosphere having carbon dioxide between about 5–12% by volume is disclosed in U.S. Pat. No. 3,445,240, issued May 20, 1969 to Bedrosian et al. Injecting gas, such as carbon dioxide, into meat to expand the internal tissue structure is disclosed in U.S. Pat. No. 3,216,826, issued Nov. 9, 1965 to Wattenbarger. Finally, utilizing a pressurized oxygen or carbon dioxide atmosphere to inactivate enzymes is disclosed in the above-mentioned U.S. Pat. No. 3,442,660.

SUMMARY

The present invention relates to a meat treating method, and more particularly to a method of treating meat utilizing carbon dioxide under pressure.

It has now been found that, by subjecting meat to an atmosphere of carbon dioxide under certain parameters, the meat will be tenderized and shrinkage upon subsequent cooking will be reduced to an unexpected degree.

It is a general object of this invention to provide a simple and efficient process for tenderizing meat.

Another object is to provide a meat treating method which provides reduced shrinkage of the meat upon subsequent cooking.

The above objects are realized by subjecting meat to an atmosphere of carbon dioxide under a pressure of at least 30 p.s.i.g. and up to about 135 p.s.i.g.

The above objects, and other objects and advantages of the invention, will become better understood from the following description when taken in conjunction with the accompanying drawing.

DRAWING

The drawing is a graph showing time-pressure curves and a cross-hatched area representing the time and pressure operating range of the invention.

DESCRIPTION

I have discovered that subjecting meat to an atmosphere of carbon dioxide under certain parameters tenderizes the meat and reduces the shrinkage thereof upon subsequent cooking. It has been discovered that the period of time between processing and cooking has an effect upon the amount of reduction of shrinkage. While reductions in shrinkage, as measured by reduced weight loss upon cooking, of up to 20% and more have been achieved, preferably the reduction is at least 15%. Using this as a preferred minimum standard, meat was processed at various pressures with the time before cooking being a variable. In this instance, the meat processed was ground beef and the average weight loss of 32 unprocessed control tests was 38.5%. All results hereinafter given in Tables I, II and III are the average of at least three identical tests. In cooking of both the control and processed samples, an electric frying pan with a thermostatic control is used. The pan is preheated to a cooking temperature of 325° F. Each ground beef pattie of 70 grams ±2 grams, is cooked 4 minutes on each side.

TABLE I

| Type of meat | Process P.s.i.g. | Time, mins. | Time before cooking | Percent weight loss after cooking |
|---|---|---|---|---|
| Ground beef | 30 | 15 | 15 minutes | 38.3 |
| Do | 30 | 15 | 30 minutes | 37.5 |
| Do | 30 | 15 | 45 minutes | 36.7 |
| Do | 30 | 15 | 1 hour | 36.6 |
| Do | 30 | 15 | 2 hours | 36.6 |
| Do | 30 | 15 | 3 hours | 33.7 |
| Do | 30 | 15 | 4 hours | 33.4 |
| Do | 30 | 15 | 5 hours | 31.6 |
| Do | 30 | 15 | 6 hours | 31.5 |
| Do | 30 | 15 | 7 hours | 31.7 |
| Do | 30 | 15 | 12 hours | 31.7 |
| Do | 30 | 15 | 24 hours | 31.6 |
| Do | 30 | 15 | 72 hours | 31.1 |
| Do | 30 | 15 | 96 hours | 31.2 |
| Do | 30 | 15 | 158 hours | 31.4 |
| Do | 30 | 15 | 240 hours | 31.4 |
| Do | 90 | 5 | 15 minutes | 38.3 |
| Do | 90 | 5 | 30 minutes | 37.3 |
| Do | 90 | 5 | 45 minutes | 36.5 |
| Do | 90 | 5 | 1 hour | 35.9 |

TABLE 1—Continued

| Type of meat | Process P.s.i.g. | Time, mins. | Time before cooking | Percent weight loss after cooking |
|---|---|---|---|---|
| Do | 90 | 5 | 2 hours | 34.0 |
| Do | 90 | 5 | 3 hours | 32.6 |
| Do | 90 | 5 | 4 hours | 31.9 |
| Do | 90 | 5 | 5 hours | 31.6 |
| Do | 90 | 5 | 6 hours | 31.5 |
| Do | 90 | 5 | 7 hours | 31.4 |
| Do | 90 | 5 | 12 hours | 31.2 |
| Do | 90 | 5 | 24 hours | 31.2 |
| Do | 90 | 5 | 72 hours | 31.2 |
| Do | 90 | 5 | 96 hours | 31.1 |
| Do | 90 | 5 | 158 hours | 31.1 |
| Do | 90 | 5 | 240 hours | 31.1 |
| Do | 120 | 5 | 15 minutes | 38.0 |
| Do | 120 | 5 | 30 minutes | 35.7 |
| Do | 120 | 5 | 45 minutes | 34.0 |
| Do | 120 | 5 | 1 hour | 33.1 |
| Do | 120 | 5 | 2 hours | 32.8 |
| Do | 120 | 5 | 3 hours | 31.4 |
| Do | 120 | 5 | 5 hours | 31.4 |
| Do | 120 | 5 | 7 hours | 31.1 |
| Do | 135 | 3 | 15 minutes | 38.0 |
| Do | 135 | 3 | 30 minutes | 35.0 |
| Do | 135 | 3 | 45 minutes | 33.0 |
| Do | 135 | 3 | 1 hour | 32.8 |
| Do | 135 | 3 | 2 hours | 32.6 |
| Do | 135 | 3 | 3 hours | 31.4 |
| Do | 135 | 3 | 5 hours | 31.2 |
| Do | 135 | 3 | 7 hours | 31.1 |

From the above it is concluded that the preferred lapse of time between processing and cooking is at least four hours to provide adequate reduction of shrinkage as measured by weight loss upon cooking. Using this time lapse as a preferred minimum standard, meat was processed with the pressures being varied and showing the results in Table II.

TABLE II

| Type of meat | Process P.s.i.g. | Time, mins. | Time before cooking, hrs. | Percent weight loss after cooking |
|---|---|---|---|---|
| Ground beef | 5 | 30 | 4 | 37.5 |
| Do | 15 | 30 | 4 | 33.8 |
| Do | 30 | 30 | 4 | 32.6 |
| Do | 45 | 30 | 4 | 31.8 |
| Do | 60 | 30 | 4 | 31.4 |
| Do | 75 | 30 | 4 | 31.4 |
| Do | 90 | 30 | 4 | 31.2 |
| Do | 105 | 30 | 4 | 31.2 |
| Do | 120 | 30 | 4 | 31.4 |
| Do | 135 | 30 | 4 | 31.2 |
| Do | 5 | 15 | 4 | 38.0 |
| Do | 15 | 15 | 4 | 35.4 |
| Do | 30 | 15 | 4 | 33.6 |
| Do | 45 | 15 | 4 | 32.2 |
| Do | 60 | 15 | 4 | 31.6 |
| Do | 75 | 15 | 4 | 31.6 |
| Do | 90 | 15 | 4 | 31.4 |
| Do | 105 | 15 | 4 | 31.2 |
| Do | 120 | 15 | 4 | 31.4 |
| Do | 135 | 15 | 4 | 31.2 |
| Do | 5 | 5 | 4 | 38.4 |
| Do | 15 | 5 | 4 | 36.6 |
| Do | 30 | 5 | 4 | 34.7 |
| Do | 45 | 5 | 4 | 34.0 |
| Do | 60 | 5 | 4 | 33.5 |
| Do | 75 | 5 | 4 | 32.5 |
| Do | 90 | 5 | 4 | 31.9 |
| Do | 105 | 5 | 4 | 31.6 |
| Do | 120 | 5 | 4 | 31.4 |
| Do | 135 | 5 | 4 | 31.2 |

The underlined tests in Table II represent the process pressures and times at which at least a 15% reduction in weight loss is achieved, with the time lapse before cooking being a constant four hours. From this it could be perceived that pressures greater than 75 p.s.i.g. would require a process time of less than five minutes to achieve the same results. Accordingly, tests were run at various higher pressures and varying the process time as shown in Table III.

TABLE III

| Type of meat | Process P.s.i.g. | Time, mins. | Time before cooking, hrs. | Percent weight loss after cooking |
|---|---|---|---|---|
| Ground beef | 90 | 1 | 4 | 37.3 |
| Do | 90 | 2 | 4 | 35.4 |
| Do | 90 | 3 | 4 | 33.5 |
| Do | 90 | 5 | 4 | 31.9 |
| Do | 120 | 1 | 4 | 32.4 |
| Do | 120 | 2 | 4 | 31.2 |
| Do | 120 | 3 | 4 | 31.4 |
| Do | 120 | 5 | 4 | 31.4 |
| Do | 135 | 1 | 4 | 31.2 |
| Do | 135 | 2 | 4 | 31.4 |
| Do | 135 | 3 | 4 | 31.2 |
| Do | 135 | 5 | 4 | 31.2 |

The underlined tests in Tables II and III are plotted on the graph shown in the drawing and establish line A thereof extending between 30 p.s.i.g. and 135 p.s.i.g. which are the preferred limits of the present invention. Line A represents the minimum time-pressure curve of the invention; that is, the minimum process time for the various pressure to achieve the surprising results of at least 15% reduction in shrinkage or weight loss. As a practical economic limitation, it is considered that the maximum process times for the various pressures should not exceed six times the minimum process times. Line B in the drawing represents the maximum time-pressure curve for the invention, and the cross-hatched area represents the time and pressure operating range of the invention.

While the above tests were made utilizing ground beef, various other types of meat and cuts of meat have proven to be within the described operating range. Beef, in the form of round steak, was processed at 30, 90, 120 and 135 p.s.i.g. The unprocessed control had a weight loss of 30.8% upon subsequent cooking using the same cooking procedure described above for ground beef. The processed round steak had a maximum weight loss of 24.1% after a four hour lapse before cooking. This is a minimum improvement of nearly 22% in reduced weight loss.

Beef, in the form of sirloin eye having an initial weight of 1042 grams, was processed at 90 p.s.i.g. for 5 minutes and then cooked 1½ hours at 325° F. after a time lapse of 4 hours. Its weight after cooking was 742 grams or a 28.9% weight loss. An identical weight control sample weighed 695 grams after cooking under identical temperature and time conditions for a 33.4% weight loss. The processed meat had about 13.5% less weight loss, which is reasonably close to the desired reduction. The tenderness of the control and processed samples was determined using a Feed Service Company Tenderometer of the type described in U.S. Pat. No. 3,554,018, issued Jan. 12, 1971 to Anderson et al. The measured tenderness of the control was given a value of 100% and, by comparison, the tenderness of the processed meat was 143%.

Beef, in the form of round bone shoulder roast having an initial weight of 535 grams, was processed at 90 p.s.i.g. for 10 minutes and then cooked 1¼ hours at 325° F. after a time lapse of 18 hours. Its weight after cooking was 345 grams or a weight loss of 35.5%. A control sample having an initial weight of 521 grams was cooked under identical temperature and time conditions. Its weight after cooking was 283 grams or a weight loss of 45.7%. The processed meat had about 22% less weight loss. The tenderness of the control and processed samples was determined on the above-described Tenderometer. The processed sample had a tenderness of 188% compared to the control sample.

Pork, in the form of a loin roast with bone and having an initial weight of 857 grams, was processed at 90 p.s.i.g. for 15 minutes and then cooked two hours at 325° F. after a time lapse of 18 hours. Its weight after cooking was 675 grams or a weight loss of 21.2%. An identical weight control sample weighed 628 grams after cooking under identical temperature and time conditions for a 26.8% weight loss. Thus, the processed meat had about 21% reduction in weight loss. The tenderness of the control and processed samples was determined on the above-described Tenderometer. The processed sample had a tenderness of 118% compared to the control sample.

Multiple tests were run on boneless pork loin to compare with an average weight loss of 28.4% of three control samples, with the results shown in Table IV.

TABLE IV

| Type of meat | Process P.s.i.g. | Time, mins. | Time before cooking, hrs. | Percent weight loss after cooking |
|---|---|---|---|---|
| Pork loin (boneless) | 30 | 15 | 4 | 20.7 |
| Do | 30 | 15 | 5 | 19.6 |
| Do | 30 | 15 | 7 | 19.3 |
| Do | 30 | 15 | 12 | 19.1 |
| Do | 30 | 15 | 24 | 19.2 |
| Do | 90 | 5 | 4 | 20.0 |
| Do | 90 | 5 | 5 | 19.5 |
| Do | 90 | 5 | 7 | 19.3 |
| Do | 90 | 5 | 12 | 19.2 |
| Do | 90 | 5 | 24 | 19.2 |
| Do | 120 | 5 | 4 | 19.1 |
| Do | 120 | 5 | 5 | 19.2 |
| Do | 120 | 5 | 7 | 19.2 |
| Do | 135 | 3 | 4 | 19.3 |
| Do | 135 | 3 | 5 | 19.2 |
| Do | 135 | 3 | 7 | 19.1 |
| Do | 135 | 3 | 12 | 19.2 |

Lamb, in the form of a portion of a leg having an initial weight of 762 grams, was processed at 90 p.s.i.g. for 15 minutes and then cooked 1¼ hours at 325° F. after a time lapse of 18 hours. Its weight after cooking was 610 grams or a weight loss of 20%. A control sample having an initial weight of 743 grams was cooked under identical temperature and time conditions. Its weight after cooking was 554 grams or a weight loss of 25.4%. Thus, the processed meat had about 21% less weight loss. The tenderness of the control and processed samples was determined on the above-described Tenderometer. The processed sample had a tenderness of 123% compared to the control sample.

Fowl, in the form of turkey breast having an initial weight of 1133 grams was processed at 90 p.s.i.g. for 15 minutes and then cooked 1¼ hours at 325° F. after a time lapse of 42 hours. Its weight after cooking was 867 grams or a weight loss of 23.6%. A control sample having an initial weight of 1078 grams was cooked under identical temperature and time conditions. Its weight after cooking was 761 grams or a weight loss of 29.3%. The processed meat had about 19% less weight loss. The tenderness of both samples was determined on the above-described Tenderometer. The processed sample had a tenderness of 124% compared to the control sample.

Multiple tests were run on fowl in the form of chicken legs to compare with an average weight loss of 35.8% of three control samples, with the results shown in Table V.

TABLE V

| Type of meat | Process P.s.i.g. | Time, mins. | Time before cooking, hrs. | Percent weight loss after cooking |
|---|---|---|---|---|
| Chicken legs | 90 | 5 | 4 | 30.3 |
| Do | 90 | 5 | 5 | 30.3 |
| Do | 90 | 5 | 7 | 30.1 |
| Do | 90 | 5 | 12 | 30.2 |
| Do | 90 | 5 | 24 | 30.2 |
| Do | 120 | 5 | 4 | 30.3 |
| Do | 120 | 5 | 5 | 30.2 |
| Do | 120 | 5 | 7 | 30.2 |

In the process of the present invention as utilized above, the meat is placed into a vessel capable of being pressurized. The vessel is purged by a flow of carbon dioxide through it prior to pressurizing. The vessel is then pressurized to subject the meat to an atmosphere of carbon dioxide under a pressure of at least 30 p.s.i.g. and up to about 135 p.s.i.g. A still preferred range is about 30 to 90 p.s.i.g. The carbon dioxide used is 99.999% pure or substantially 100% carbon dioxide. The time of pressurization is at least the time-pressure curve A of the drawing and less than six times said amount of time as shown by curve B of the drawing. The pressure is released and the meat stored at atmospheric pressure for about 4 hours or more. The processed meat is thereafter cooked with a reduced weight loss of about 15% or greater improvement. The process also improves tenderness of the meat a substantial amount.

The embodiments of the invention in which an exclusive property or privilege is claimed are defined as follows:

1. A method for tenderizing meat and reducing the shrinkage thereof upon cooking, consisting of: subjecting the meat selected from the group of beef, pork, lamb and fowl to an atmosphere of substantially 100% carbon dioxide under a pressure between 30 and 120 p.s.i.g., for an amount of time between a minimum of thirty minutes at 30 p.s.i.g., fifteen minutes at 45 p.s.i.g., five minutes at 75 p.s.i.g. or one minute at 120 p.s.i.g., and a maximum of six times the minimum time for the stated pressures.

2. A method for tenderizing meat and reducing the shrinkage thereof upon cooking as set forth in claim 1 wherein the pressure is between 30 and 75 p.s.i.g.

3. A method for tenderizing meat and reducing the shrinkage thereof upon cooking as set forth in claim 1 including the preliminary steps of placing the meat into a vessel capable of being pressurized, and purging the vessel by a flow of substantially 100% carbon dioxide prior to pressurizing the same with said carbon dioxide to subject the meat to said atmosphere of carbon dioxide.

References Cited

UNITED STATES PATENTS 3,442,660   5/1969   Shank _____ 99—107

HYMAN LORD, Primary Examiner